Dec. 20, 1966 P. W. COVERT 3,293,533
MAGNETIC AMPLIFIER CONTROL APPARATUS
Filed July 5, 1962 2 Sheets-Sheet 1

INVENTOR.
PAUL W. COVERT
BY
SHANLEY & O'NEIL
ATTORNEYS

INVENTOR.
PAUL W. COVERT
BY
SHANLEY & O'NEIL
ATTORNEYS 3,293,533
MAGNETIC AMPLIFIER CONTROL APPARATUS
Paul W. Covert, Valencia, Pa., assignor to Magnetics, Inc., a corporation of Pennsylvania
Filed July 5, 1962, Ser. No. 207,584
6 Claims. (Cl. 321—47)

This invention is concerned with electrical control apparatus. In one of its more specific aspects the invention is concerned with static relay equipment.

Reliability, maintenance-free operation, ruggedness, and long life make magnetic amplifiers ideally suited for conrtol of other static devices such as solid state thyratrons. There are, however, certain inherent characteristics in both magnetic amplifiers and thyratron devices which curtail use of this otherwise advantageous combination-especially in the static relay field where high-gain, high-sensitivity, full-on or full-off control is desired. To examine reasons for such curtailment, consider that a thyratron device can fire anywhere in its positive-anode half cycle. Also, that conventional magnetic amplifiers have not been able to produce a desirable firing signal occurring only early in a half cycle. Therefore, in combination, the magnetic amplifier and a thyratron device have generally been suitable only for applications which require a firing signal controllable over the mid-range of a half cycle. For relaying functions, unless switching can be made to occur early in a half cycle the relay apparatus is not very efficient.

Conventional magnetic amplifiers show other deficiencies when used in sensitive control applications. For example, it has not been possible with conventional magnetic amplifier circuitry to produce a signal which was steepened in amplitude with respect to its time function. Nor has it been able to produce a signal which was completely controllable in amplitude. It is a main objective of this invention to provide magnetic amplifier method and means for producing an output signal which is steepened in amplitude with respect to its time function, is completely controllable in amplitude, and occurs only early in a controlled half cycle. To accomplish this objective, the invention teaches a new approach to the operation of magnetic amplifier circuitry in which advantage is taken of the early demand of a saturable reactor on supply voltage in an overdriven magnetic amplifier.

In describing the invention reference will be had to the accompanying drawings wherein.

Figure 1:
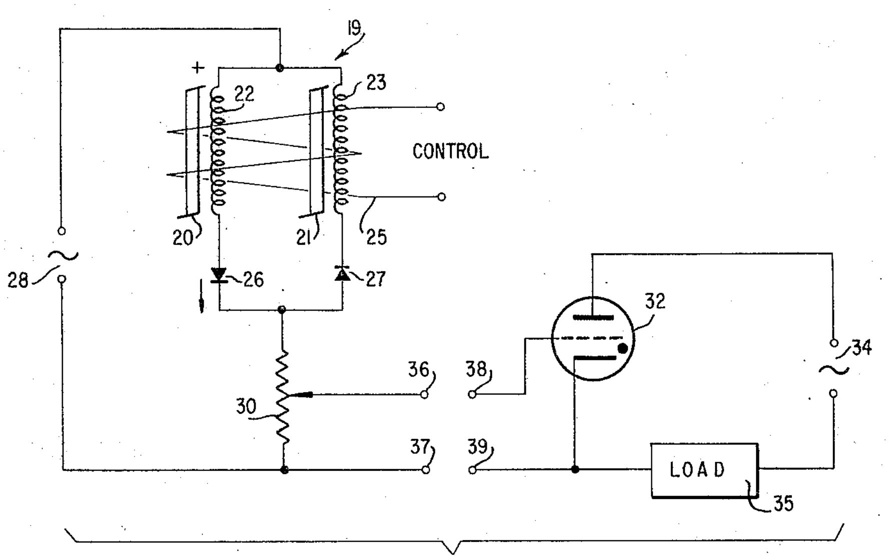
FIGURE 1 is a schematic diagram of conventional magnetic amplifier relay apparatus.

A full wave, self-saturating magnetic amplifier conventionally used for gating a thyratron device and a thyratron controlled load circuit adapted for connection to the output of the magnetic amplifier are shown schematically in FIGURE 1. Magnetic amplifier 19 includes saturable cores 20, 21, load windings 20, 22, control winding 25, and rectifiers 26, 27. In a manner well known in the art, the magnetic amplifier 19 controls delivery of power from A.C. source 28 to load resistor 30. Details of operation of this circuit are available in U.S. Patent 2,786,966, entitled "Thyratron Control Circuit," issued March 26, 1957.

The output of magnetic amplifier 19 is used to fire thyratron device 32 and thereby control delivery of power from an A.C. source 34 to load 35. The circuit of FIGURE 1 presents a conventional method for obtaining a control signal for a thyratron from across the load resistor of a magnetic amplifier. The control signal is removed at terminals 36 and 37 and delivered through circuit means including terminals 38 and 39 to the grid of thyratron device 32. The magnetic amplifier circuitry of FIGURE 1 can be used for either half wave or full wave power control as described in the above identified Patent No. 2,786,966.

Figures 2, 3:
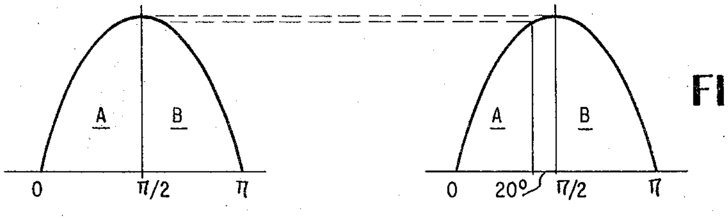
FIGURES 2 and 3 are voltage waveforms of the circuit of FIGURE 1.

In the operation of the magnetic amplifier of FIGURE 1, assuming a positive cycle with current flow through rectifier 26 as indicated, prior to saturation of core 20 load voltage appears across winding 22 and no firing signal is available at load resistor 30. Upon saturation of core 20 load voltage appears across load resistor 30 and a firing signal is delivered to the thyratron device 32. Referring to FIGURE 2, assuming core 20 saturates at $\pi/2$ in the half cycle, then load voltage appears across winding 22 during the "A" portion of the half cycle and appears across load resistor 30 during the "B" portion of the half cycle. Note that an output control signal from the magnetic amplifier is obtained only after firing of the saturable reactor in the half cycle.

Assuming control current flow in winding 25 such that firing occurs at $\pi/2$ minus 20° in the half cycle, the waveform for this condition is shown in FIGURE 3. A comparison of FIGURES 2 and 3 illustrates a limitation of conventional magnetic amplifiers when used to control other devices. Where the device to be controlled is amplitude responsive, there is practically no control in amplitude available. The invention overcomes this shortcoming in the prior art by providing a magnetic amplifier having an output signal which is completely controllable in amplitude and therefore suitable for controlling voltage amplitude responsive apparatus such as on-off relay (thyratron) devices and proportioning amplifiers.

Figure 4:
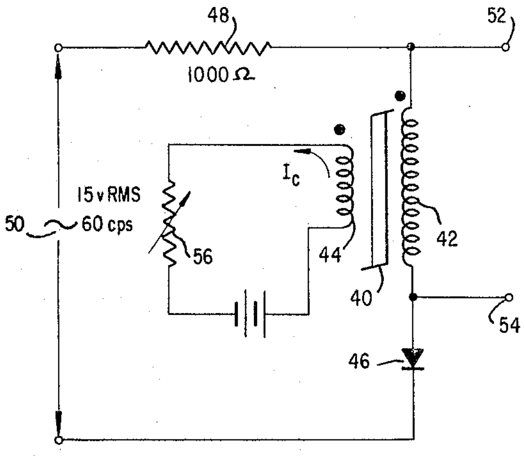
FIGURE 4 is a schematic diagram of magnetic amplifier apparatus embodying the invention.

Referring to FIGURE 4, a magnetic amplifier operated in accordance with the teachings of the invention is shown in order. Half wave magnetic circuitry is shown to simplify explanation of the invention. The magnetic amplifier of FIGURE 4 includes saturable core 40, load winding 42, control winding 44 and rectifier 46. Load winding 42 is connected in series with rectifier 46 and load resistor 48 and is supplied from A.C. source 50. The invention departs initially from the prior art by taking a control signal output from across load windings 42 at terminals 52 and 54; the advantages stemming from this departure will be discussed in more detail in later paragraphs.

Considering control of the magnetic amplifier of FIGURE 4, control current $I_c$ is under the control of rheostat 56. In practice, a properly connected temperature, humidity, pressure, or other condition sensing device may serve the same function as that of rheostat 56. The dots shown indicate the direction of winding of the load and control windings on the saturable core 40.

Note that the output control signal of the magnetic amplifier is taken from across load winding 42 rather than across resistor 48. By this innovation, a control signal is available prior to saturation of the core 40. Upon saturation of core 40 the voltage in the circuit appears across load resistor 48. By taking advantage of the voltage absorbed early in the half cycle by a saturable reactor, and a further step described below, a control signal output is available which will occur only early in the half cycle.

Figure 6:
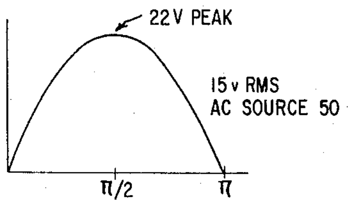
FIGURES 6 through 10 are voltage waveforms of the circuit of FIGURE 4.
Figure 5:
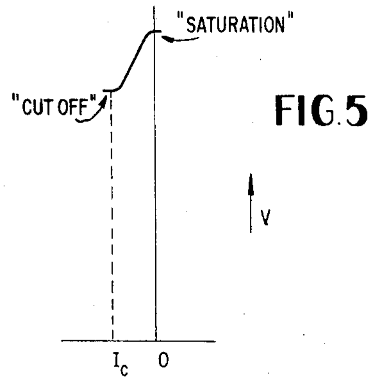
FIGURE 5 is a transfer curve of magnetic amplifier apparatus operated in accordance with the invention.
Figure 7:
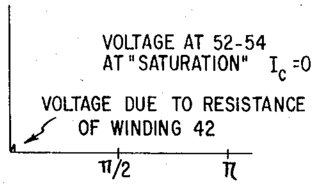
Figure 8:
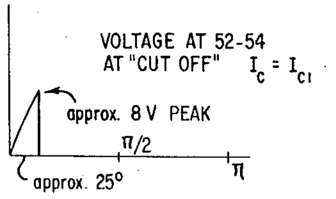
Figure 9:
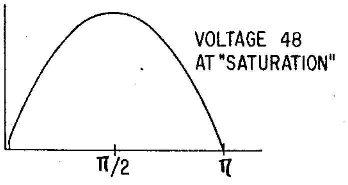

The invention departs further from conventional practice by over-driving (over-exciting) the magnetic amplifier with a voltage substantially above the voltage it normally would absorb. A practical range is from about eight times to about fifteen times the capacity of the magnetic amplifier to absorb voltage. An average over driving ratio of about 10 to 1 is satisfactory. For example, a saturable reactor which is able to absorb, or exercise control over, about 1.5 volts is driven from a voltage supply of about 15 volts. The effect of over-driving the saturable reactor is to produce a magnetic amplifier whose transfer curve is moved along the ordinate axis as shown in FIGURE 5. The resulting waveforms in the circuit of FIGURE 4 are shown in FIGURES 6 through 10. FIGURE 6 shows the voltage waveform of a half cycle of the source 50. In discussing the FIGURES 7 through 10 and operation of the magnetic amplifier of the invention, reference will be had to the terms "saturation" and "cut-off." The term "saturation" as used herein means a condition where the wound core 40 absorbs the minimum voltage that is possible: $I_c=0$, core 40 is saturated, and the voltage across load winding 42 at terminals 52–54 is miniscule. FIGURE 7 attempts to show the negligible voltage drop across winding 42 appearing at terminals 52–54 in this condition. The voltage across resistor 48 during "saturation" is at a maximum and is shown in FIGURE 9.

Figure 10:
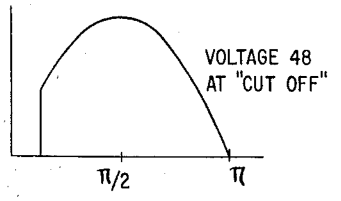

"Cut-off" as used herein, refers to the condition where the wound core 40 absorbs the maximum voltage of which it is capable. In this condition, $I_c=I_{c1}$, typically about 0.1 milliampere for the circuit values shown, with the voltage appearing across load winding 42 being as shown in FIGURE 8 and the voltage appearing across resistor 48 being as shown in FIGURE 10.

The voltage appearing at terminals 52–54 of FIGURE 4 can be used to control any voltage amplitude responsive apparatus. In the proportioning field, this would include many types of vacuum tube and transistor electronic amplifiers as well as magnetic amplifiers. In the relay or switching field this would include conventional electronic and solid state devices such as gas thyratrons and silicon controlled rectifiers.

Figure 11:
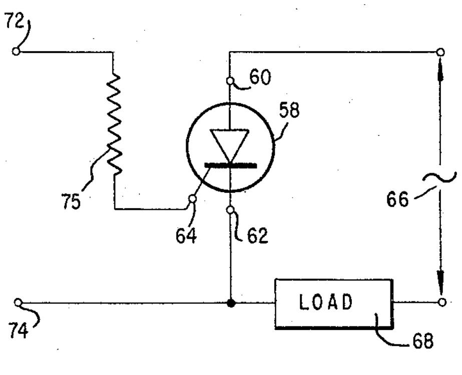
FIGURE 11 is a schematic diagram of voltage amplitude responsive means operative with the magnetic amplifier apparatus of FIGURE 4.

FIGURE 11 illustrates the connection of a typical thyratron device to be controlled by the magnetic amplifier of FIGURE 4. Thyratron 58 can be termed a controllable unidirectional conducting device but is more commonly referred to as a silicon controlled rectifier and has main terminals, anode 60, cathode 62, and gate terminal 64. A.C. source 66 is connected across main terminals 60 and 62 so that switching or firing of device 58 controls delivery of power from A.C. source 66 to load 68. A.C. source 66 is in phase with A.C. source 50 of FIGURE 4 or, as will be shown later, can be the same source. A control firing signal for device 58 is picked up at terminals 72, 74 and, through attendant circuitry including coupling resistor 75, delivered to gate terminal 64.

Some typical circuit values for the relay apparatus of FIGURES 4 and 11 are shown in the drawings and presented below:

| | |
|---|---|
| Control current $I_c$ | 0.1 milliamp (controlling about 5 watts in load 68). |
| Control winding **44** | 1000 turns. |
| Load winding **42** | 1000 turns. |
| Saturable core **40** | Permalloy 80 [1]. |
| Thyratron device **58** | SCR 2N1881, available commercially. |

[1] An alloy of approximately 80% nickel and 20% iron.

In operation, it should be noted that when the magnetic amplifier is in "cut-off" condition the SCR will be turned full-on; when the magnetic amplifier is in the "saturated" condition the SCR will be turned full-off.

Figure 12:
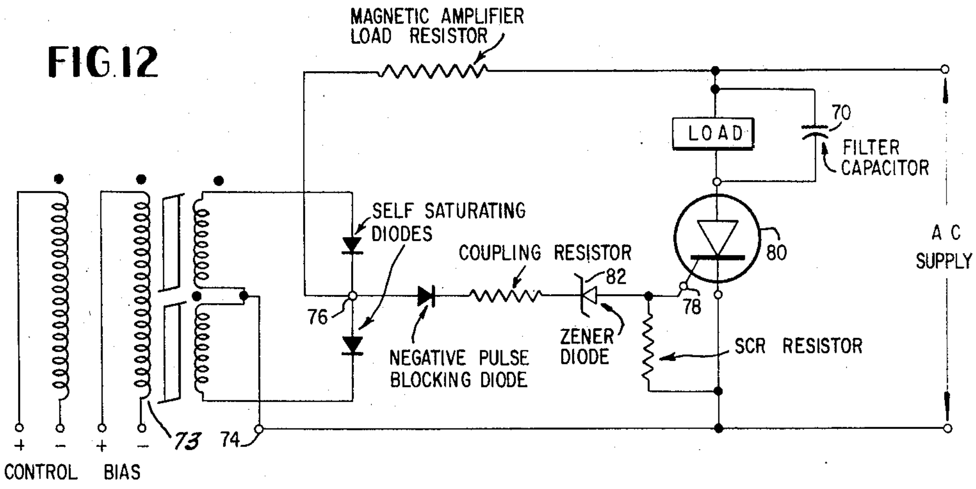
FIGURE 12 is a schematic diagram of magnetic amplifier relay apparatus embodying the invention.

FIGURE 12 shows a magnetic amplifier capable of full wave control. Operation of this circuit will be obvious to those having skill in the art from the previous description. While the magnetic amplifier shown in FIGURE 12 is capable of full wave control, as shown only the positive pulse is used in control. Although a control signal is required in only one half cycle in this embodiment, the full wave magnetic amplifier is preferred in practice similar, in this respect, to conventional magnetic amplifiers. With a filter capacitor 70 connected across the main load, filtered D.C. is obtained in a conventional manner. It will be obvious that full wave A.C. control can be obtained by properly connecting another thyratron device to utilize the negative pulse from the magnetic amplifier or, full wave A.C. control may be obtained by using the magnetic amplifier of FIGURE 12 to control a thyratron device connected as shown in applicant's co-pending application entitled "Control Apparatus" filed April 4, 1966, S.N. 540,107, a continuation of the application filed July 5, 1962, Ser. No. 207,611 (now abandoned).

Figure 13:
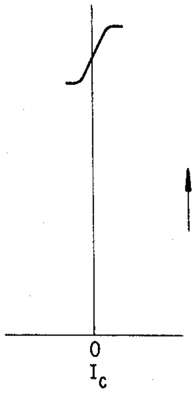
FIGURE 13 is a transfer curve of a magnetic amplifier apparatus operated in accordance with the invention.

The present invention provides further means for improving control of the output signal of a magnetic amplifier such as that shown in FIGURE 12. Reference will be had to FIGURES 5 and 13 in describing this feature. With zero control signal ($I_c=0$) a self-saturating magnetic amplifier will remain in "saturaiton." It is well known in the art that this is a region of low gain. Therefore it would be advantageous to shift the zero control signal point to occur at about mid-range of the magnetic amplifier's transfer curve. When this is done the transfer curve for the over excited magnetic amplifier of the invention will be as shown in FIGURE 13.

To accomplish this shift of zero point in the transfer curve a shunt can be placed across the magnetic amplifier rectifiers for leakage reset control or another control winding can be added to the magnetic amplifier. Referring to FIGURE 12, an additional control winding takes the form of bias winding 73. However with the addition of bias winding 73, a biasing signal will cause an output voltage to appear across the terminals 74 and 76 when $I_c=0$. To suppress this voltage, or keep this voltage from gate 78 of thyratron 80, a Zener diode 82, of proper voltage design (low power, blocking about 4 volts), is placed in series in the gate-cathode circuit of the thyratron device 80. The Zener diode in effect blocks voltage appearing across the load winding due to the biasing signal and the entire control will then be zeroed at midpoint in the transfer curve. Any control current signal into the magnetic amplifier will then cause it to respond in the high gain region of its transfer curve.

In accordance with the teachings of the invention an efficient relay device, readily controllable to full-on or full-off condition and sufficiently sensitive to handle substantially any automatic control function is provided. For example, a static relay device constructed and operated in accordance with the teachings of the invention can respond to signals in the order of $10^{-9}$ watts to handle power in the order of 5 watts, or can handle larger units of power with similar gains.

Applications for the present invention are numerous and will be obvious to those having skill in the art. Also many changes and substitutions of equivalents in the disclosed circuitry may be made by those having skill in the art, for example, leakage reset means, that is a controllable impedance element shunting the magnetic amplifier rectifier means, can be used as a control means in place of control windings on the magnetic amplifier. Therefore, for purposes of determining the scope of the invention reference shall be had to the accompanying claims.

I claim:

1. Static relay apparatus comprising
magnetic amplifier means including saturable core means, load winding means, and rectifier means,
A.C. voltage supply means for the magnetic amplifier means sufficient to overdrive the magnetic amplifier means in the range of 8 to 15 times its normal voltage regulating capacity,
resistor means connected in a series circuit with the load winding means and rectifier means, the series circuit being connected across the A.C. voltage supply means,
control winding means for the magnetic amplifier,
bias winding means for the magnetic amplifier,
controllable unidirectional conducting means including anode terminal means, cathode terminal means, and gating terminal means,
circuit means for connecting the cathode terminal means and the gating terminal means of the unidirectional conducting device across the load winding means of the magnetic amplifier means such that a firing signal is delivered to the unidirectional conducting means prior to saturation of the saturable core means of the magnetic amplifier means, and
Zener diode means connected to the gating terminal means for blocking bias signal voltage.

2. Static relay apparatus comprising
overdriven magnetic amplifier means including saturable core means, load winding means and rectifier means, with the load winding means and rectifier means serially connected across an A.C. power source, thyratron means,
means for connecting the thyratron means to control power delivered from the A.C. power source to a load means, and
means for connecting the overdriven magnetic amplifier means to the thyratron means to deliver a firing signal to the thyratron means only early in a half cycle of the A.C. power source prior to saturation of the saturable core means of the overdriven magnetic amplifier means.

3. Static relay apparatus comprising
magnetic amplifier means including saturable core means, load winding means, and control winding means, and rectifier means,
controllable rectifier means including main electrode means and gating electrode means,
means for connecting A.C. voltage supply means sufficient to overdrive the magnetic amplifier means approximately ten times rated capacity connected across the main electrode means of the controllable rectifier means and across the load windings of the magnetic amplifier means,
means for connecting load means in series with the main electrode means of the controllable rectifier means such that power is delivered to the load means upon firing of the controllable rectifier means, and
means for connecting the gating terminal means of the controllable rectifier means to the magnetic amplifier means such that a firing of the controllable rectifier means is controlled by the magnetic amplifier means to occur only prior to saturation of the magnetic amplifier means.

4. Apparatus comprising
magnetic amplifier means including saturable core means, load winding means and rectifier means,
resistor means connected in a series circuit with the load winding means and the rectifier means,
means for connecting the series circuit across an A.C. source sufficient to overdrive the magnetic amplifier, and
means connecting a load means to the overdriven magnetic amplifier means such that a signal is delivered to the load means only early in a half cycle of the A.C. source prior to saturation of the magnetic amplifier means.

5. Apparatus comprising
magnetic amplifier means including saturable core means, load winding means and rectifier means,
resistor means connected in a series circuit with the load winding means and the rectifier means,
control winding means for controlling flux level in the saturable core means,
means for connecting an A.C. source sufficient to overdrive the magnetic amplifier means across the series circuit, and
means connecting a load means to the overdriven magnetic amplifier means such that a signal is delivered to the load means during a half cycle of the A.C. source prior to saturation of the magnetic amplifier means.

6. The apparatus of claim 5 in which the load means is a voltage amplitude responsive means.

References Cited by the Examiner

UNITED STATES PATENTS

| | | | |
|---|---|---|---|
| 2,998,547 | 8/1961 | Berman | 321—25 X |
| 3,079,542 | 2/1963 | Olson | 321—25 |

JOHN F. COUCH, *Primary Examiner.*

LLOYD McCOLLUM, *Examiner.*

A. J. GAJARSA, M. L. WACHTELL, *Assistant Examiners.*